United States Statutory Invention Registration [19]

[11] Reg. Number: H552

Jones, Jr. [43] Published: Dec. 6, 1988

[54] AUTOMATIC EMPTY FLATPACK CARRIER SORTER

[75] Inventor: Arthur T. Jones, Jr., College Station, Tex.

[73] Assignee: The United States of America as represented by the Secretary of the Air Force, Washington, D.C.

[21] Appl. No.: 82,006

[22] Filed: Aug. 5, 1987

[51] Int. Cl.[4] ..... B07C 5/00

[52] U.S. Cl. ..... 209/587

*Primary Examiner*—Deborah L. Kyle
*Assistant Examiner*—Michael J. Carone
*Attorney, Agent, or Firm*—Stanton E. Collier; Donald J. Singer

[57] ABSTRACT

An empty flatpack carrier sorting device sorts empty carriers by types according to the flatpack associated with said carrier. A vision system determines from an image of a flatpack component the number and location of the leads and the size of the flatpack and thus the type of carrier associated with that flatpack. Based upon this information, a computer directs the movement of a rotatable bin such that a selected storage location falls under a funnel through which an empty flatpack carrier falls as it is ejected from the automatic carrier feed and ejection device.

1 Claim, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 1
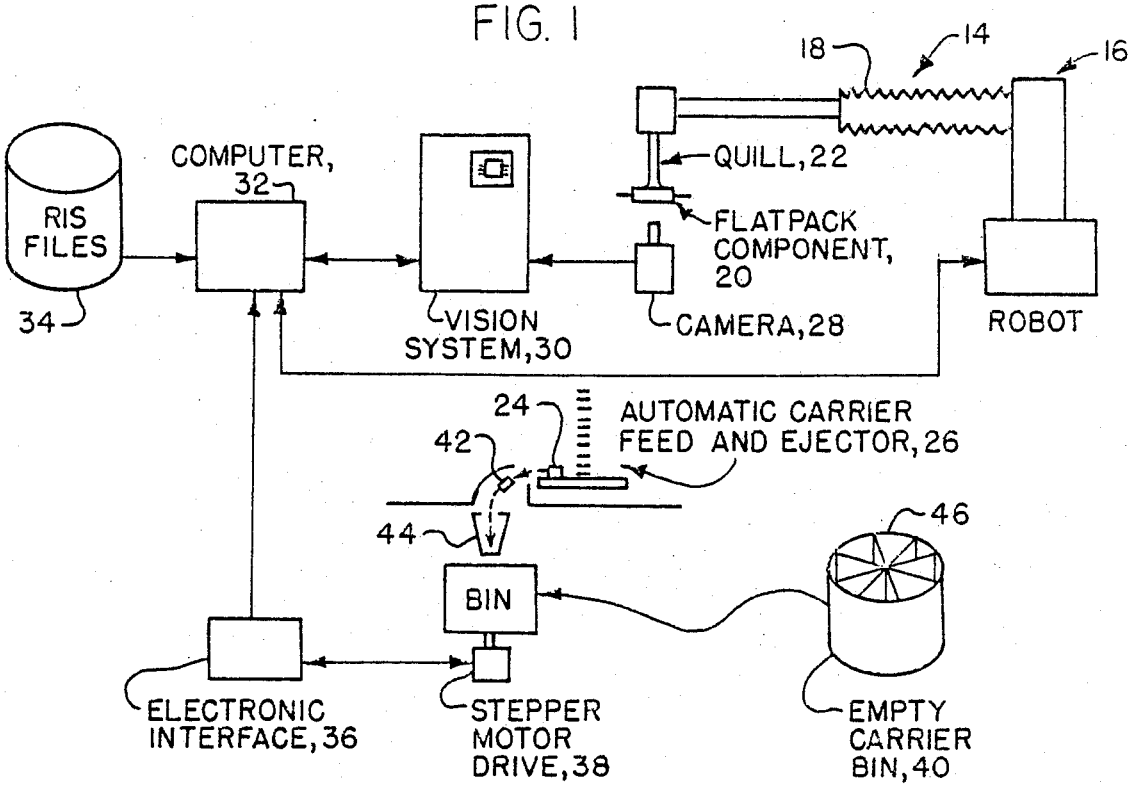
FIG. 2
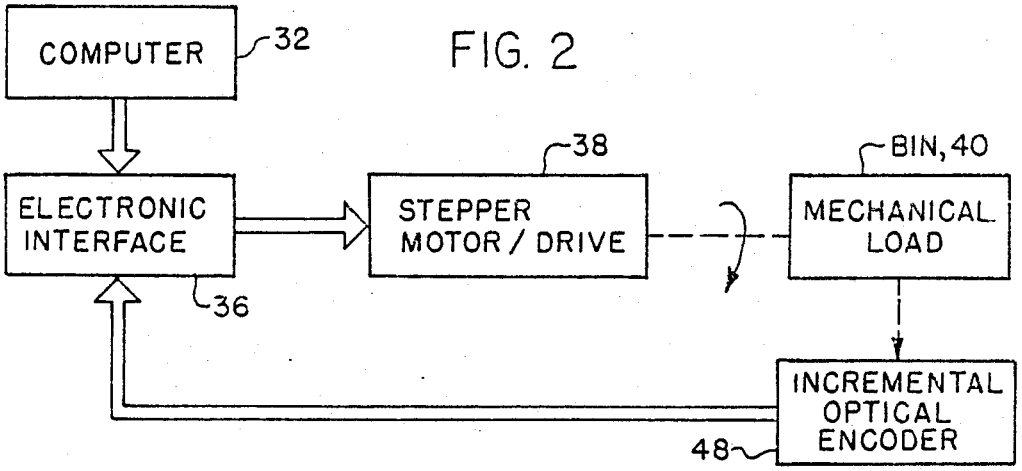
FIG. 3
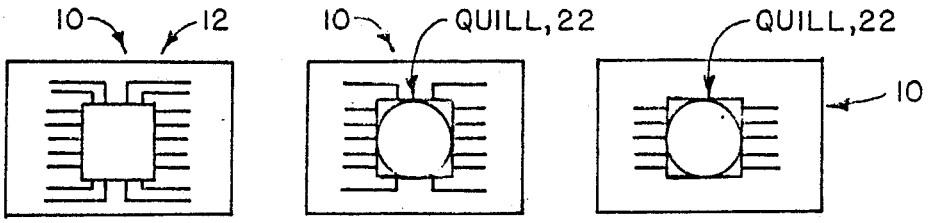
FIG. 3A FIG. 3B FIG. 3C

FIG. 4A
TOP VIEW
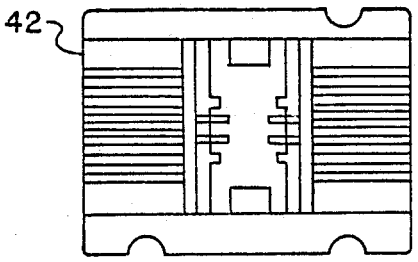
FIG. 4B
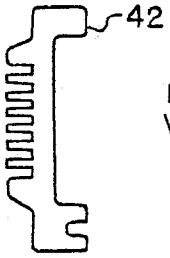
END VIEW
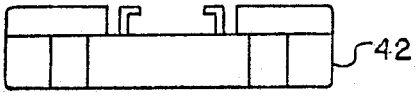
SIDE VIEW
FIG. 4C

AUTOMATIC EMPTY FLATPACK CARRIER SORTER

STATEMENT OF GOVERNMENT INTEREST

The invention described herein may be manufactured and used by or for the Government for governmental purposes without the payment of any royalty thereon.

BACKGROUND OF THE INVENTION

The present invention relates to automated manufacturing and, in particular, relates to a sorter that places empty flatpack carriers into identified storage bins.

In the area of automated manufacturing of printed circuit boards many different components are placed on each board. One type of component is a so called flat pack which is an integrated circuit device in a low-profile package with external leads in the same plane as the package itself. The leads may extend from two or all from sides of the package. As received at the assembly plant, the flatpacks are stacked in reusable carriers. In the past, as these empty carriers were ejected from the robot assembly system, they fell into a container in a random fashion so that hand sorting is required to separate the different carriers. This is clearly a very tedious task and is not effective in a large production facility.

An electronic component sorting device is shown by U.S. Pat. No. 4,429,275 which is incorporated by reference. This device examines components having leads eminating in one direction, i.e., axial; after appropriate testing, each component is dropped into a chute that leads to a container having rotating bins. The container is rotated to place the appropriate bin under the chute in accordance with the testing results on that particular device.

Although this device operates to sort electronic components a device for sorting empty flatpack carriers in sought.

SUMMARY OF THE INVENTION

The present invention is directed to a device for sorting empty flatpack component carriers.

The present invention comprises an automatic flatpack assembly device having a robot that removes that flatpacks from the carrier and places them on a printed circuit board. The flatpack is observed by a camera vision system which interfaces with a computer. Based upon the flatpack width and number of leads, the flatpack is identified and the computer instructs the robot where to place the particular flatpack on the board. Although each flatpack may be electrically the same, the physical configuration may require a different flatpack carrier. As a result, a plurality of different carriers are required. As each carrier is ejected after the flatpacks are removed, the computer directs a rotatable bin to move to a desired position for that particular flatpack carrier. The carrier falls into that bin and thus the invention greatly reduces the time required to sort the empty carriers by type.

It is therefore the object of the present invention is provide a flatpack assembly device that sorts the empty flatpack carriers.

These and many other objects and advantages of the present invention will be readily apparent to one skilled in the pertinent art from the following detailed description of a preferred embodiment of the invention and the related drawings.

BRIEF DESCRIPTION OF THE DRAWINGS

FIG. 1 illustrates by block diagram the flatpack assembly device of the present invention;

FIG. 2 illustrates by block diagram the bin control electronics;

FIG. 3 illustrates several flatpacks; and

FIG. 4 A, B, and C illustrate one type of carrier.

DETAILED DESCRIPTION OF THE PREFERRED EMBODIMENT

In the present invention, electronic devices having intergrated circuits therein are packaged as so-called flatpacks 10 having a plurality of leads 12 that radiate radially in the plane of the device as shown in FIG. 3. Similar electronic devices are built in flatpacks 10 having different widths and even different lead counts because of different sources. These flatpacks 10 of the same configuration are attached in a vertical manner in a carrier 42 as shown in FIG. 4 which is suppled by the Millross Controls, Inc. Company, for example.

In a large assembly line where many different flatpacks 10 are used, the empty carriers are collected and returned to the flatpack source for restocking. In the case where several thousands of carriers are collected, sorting of each different carrier becomes a very tedious task.

Referring to FIG. 1, a partial flatpack assembly system 14 is shown in block diagram. The means of moving the printed circuit board, not shown, onto which flatpacks 10 are placed is not shown.

A robot 16 having a movable controllable arm 18 is used to pickup a flatpack component 20. A quill 22 actually lifts the component 20 from a carrier 24. An automatic carrier feed and ejector 26 places the carrier 24 under arm 18.

A camera 28 views the flatpack component 20 and a vision system 30 counts the number of leads 12, determines location of the leads 12, and determines the width of the flatpack 10 body, for example, which allows a computer 32 to determine the flatpack component carrier type by reading the robotic instruction set (RIS) file 34 which correlates the flatpack configuration with the carrier type.

An electronic interface 36 receives the output from the computer 32 that relates to the bin position required for a bin 40 to be placed in by a stepper motor 38. The ejection of an empty carrier 42 guided by a funnel 44 causes the carrier 42 to land in a unique bin storage location 46. FIG. 2 illustrates by block diagram the electronics necessary to control bin 40. As shown in FIG. 2, an incremental optical encoder 48 feedbacks the position of bin 40 to electronic interface 36. This is an added feature that allows the system 14 to confirm that the stepper motor 38 positioned bin 40 in the right location for that particular type of flatpack.

In the above system 14, the robot 16 is a Seiko Model RT 3000; the vision system 30 is from Automatics Corporation model AV 4; the camera 28 is a panasonic model; the computer is the HP 1000 or HP 1000 A600; and the electronic interface 36 and stepper motor/drive 38 can be from Compumotor Corporation.

In operation the computer 32 with information from RIS file 34 and vision system 30 determines the type of carrier 42 to be next ejected from ejector 26. A command is then sent by computer 32 to the electronic interface 36 which converts this command into so many pulses which are then sent to the motor/driver 32 which rotates the bin 40 to the proper location. Empty carrier 42 is then ejected and falls through funnel 44 into location 46. After a given time the bin 40 is emptied and each group of empty flatpack component carriers are returned to the source for restocking.

Clearly, many modifications and variations of the present invention are possible in light of the above teachings and it is therefore understood, that within the inventive scope of the inventive concept, the invention may be practiced otherwise than specifically claimed.

What is claimed is:

1. An empty flatpack carrier sorting system, said empty flatpack carrier sorting system comprising:

an automatic carrier feed and ejection means for positioning a loaded carrier having flatpacks therein at a pickup point and for removing an empty carrier from the pickup point;

a robot means for selectively transporting said flatpacks from the pickup point to an assembly point, said robot means having a movable arm with pickup means attached thereto that removably attach to the flatpack in the loaded carrier;

a camera means for observing the physical configuration of the flatpack after said robot means removes said flatpack from said loaded carrier;

a vision system means for determining the shape of the flatpack and the number of leads therefrom, said camera means inputting an image into said vision system, said computer outputting configuration information as to the flatpack a computer, said computer receiving the configuration information from said vision system means and determining the type of carrier associated with the flatpack, said computer outputting a position signal indicative of a storage location in a bin where that empty carrier is to be deposited;

an electronic interface means, for converting said position signal into a drive signal;

means for controllably moving a bin to a particular position, said means for controllably moving receiving said drive signal from said electronic interface;

said bin, said bin having a plurality of storage locations, said means for controllably moving attached to said bin, said means moving said bin such that a selected storage location is positioned under a feed funnel so that an empty carrier falls into said selected storage location; and a feedback means for indicating to said computer where said bin is positioned.

* * * * *